(12) United States Patent
Tally

(10) Patent No.: US 6,698,906 B1
(45) Date of Patent: Mar. 2, 2004

(54) COMBINATION MAGNETIC PICK UP TOOL AND INSPECTION MIRROR

(75) Inventor: Kevin L. Tally, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 10/339,549

(22) Filed: Jan. 9, 2003

(51) Int. Cl.[7] .............................................. G02B 7/182
(52) U.S. Cl. ....................... 359/875; 359/876; 359/877; 359/864
(58) Field of Search ................................ 359/875, 876, 359/877, 864, 840, 863, 872, 881; 248/632, 682, 205.3, 480

(56) References Cited

U.S. PATENT DOCUMENTS

| | | | |
|---|---|---|---|
| 2,852,979 A | * 9/1958 | Hund | 359/875 |
| 5,247,172 A | * 9/1993 | Riemer | 250/227.21 |
| 5,428,484 A | 6/1995 | Baker | |
| 5,450,298 A | * 9/1995 | Fells et al. | 362/139 |
| 5,636,918 A | 6/1997 | Lott | 362/139 |
| 6,260,980 B1 | * 7/2001 | Ping | 362/120 |
| 6,315,340 B1 | * 11/2001 | Chen | 294/24 |
| 6,321,626 B1 | * 11/2001 | Liu | 81/451 |

OTHER PUBLICATIONS

Ullman Catalog No. 102, pp. 2–7, 1999.
Invention Disclosure Agreement from Mr. A.F. Rust, "Combination Inspection Mirror and Magnetic Pickup Tool".
Invention Disclosure Agreement from Mr. Aulie C. Register, Jr., "Combination Telescoping Mirror and Magnetic Pick Up".
Invention Disclosure Agreement from Mr. Robert Vacik, "Inspection Mirror and Magnetic Pick–Up Tool That Use Extension For Handle".
Invention Disclosure Agreement from Mr. John H. MacCnochie, "Hand Held Lighted Inspection Mirror".

\* cited by examiner

Primary Examiner—Mohammad Sikder
(74) Attorney, Agent, or Firm—Banner & Witcoff, Ltd.

(57) ABSTRACT

A combination magnetic pick up tool and inspection mirror includes a telescoping handle with a connection fixture to a magnetic pick up element. A separable mirror assembly may be attached to the magnetic pick up element. The tool thus may include a mirror assembly or a magnetic pick up element at the top section or distal end of the tool and may be easily converted from an inspection mirror to a pick up tool.

6 Claims, 3 Drawing Sheets

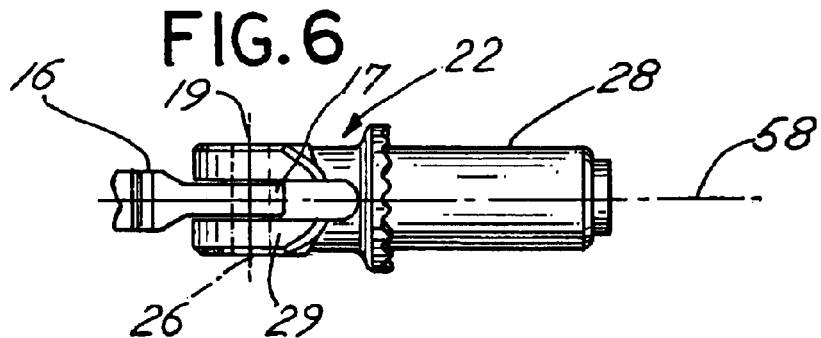
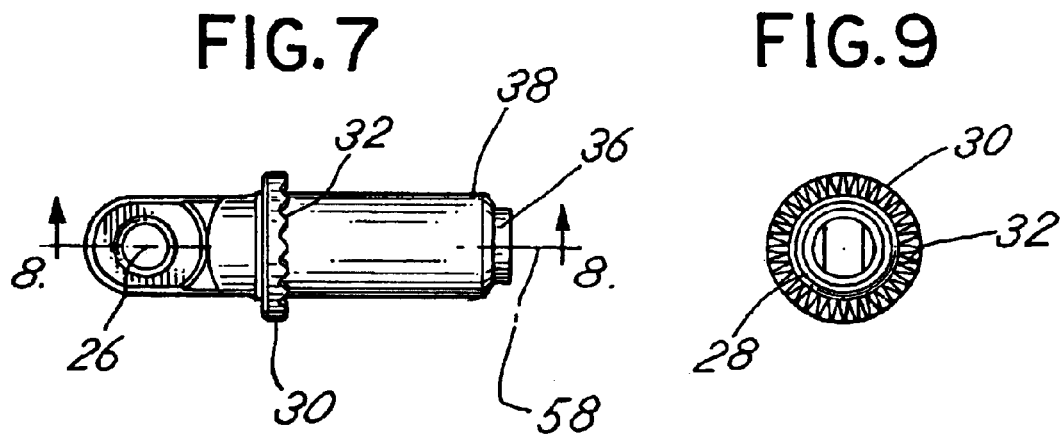
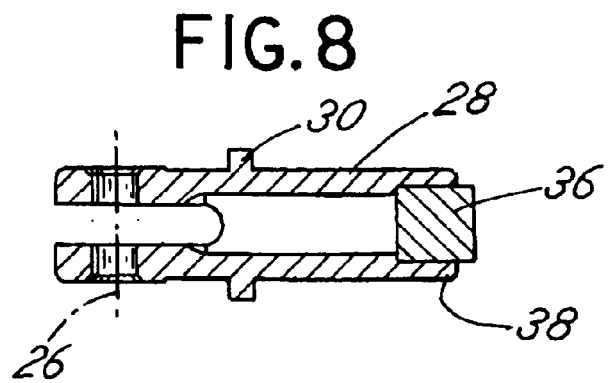

COMBINATION MAGNETIC PICK UP TOOL AND INSPECTION MIRROR

BACKGROUND OF THE INVENTION

In a principal aspect, the present invention relates to a device which comprises a combination magnetic pick up tool and an inspection mirror useful, by way of example, in the repair of vehicle engines.

When repairing a vehicle engine or assembling various types of equipment and machinery, it is often necessary to view relatively inaccessible areas of the device being repaired or serviced. To accomplish such an objective, various types of mirror devices have been available. Typically such devices comprise a mirror support assembly attached to a telescoping handle by means of a ball joint mechanism.

Also when working on a vehicle engine, for example, it is desirable to have a magnetic pick up tool available to retrieve dropped fasteners and other small metal articles which may drop into inaccessible areas. Magnetic pick up tools of this type are often mounted on the end of a telescoping handle.

A mechanic using such tools often finds it necessary to quickly change from one type of tool to the other. Thus changing from the use of an inspection mirror to a magnetic pick up tool is often a task that needs to be undertaken by a mechanic. Such change requires maintaining and locating two separate tools quickly in order not to waste time and energy when engaging in a repair or a building project. Thus there has developed a need for a magnetic pick up tool as well as an improved inspection mirror tool.

SUMMARY OF THE INVENTION

Briefly the present invention comprises a combination magnetic pick up tool and inspection mirror. The combination tool is mounted on a telescopic handle comprised of a multiple number of sections. Preferably the sections are non-rotatable one with respect to the other and may be extended to a desired length. The outermost end of the top or outer extensible section includes a connection fixture attached to the outer or free end of the top section. The connection fixture pivots about a single axis and includes a magnet mounted in a housing with a registration element included as part of the housing. The tool thus described may be used as a magnetic pick up tool.

For use as an inspection mirror, a mirror assembly is designed to fit over the connection fixture magnet housing and be retained on the housing by the magnet mounted in the housing. The mirror is maintained in proper alignment on the housing by virtue of engagement of the registration element on the connection fixture with a compatible registration element incorporated in the mirror assembly. The mirror assembly includes a replaceable mirror which is held in place by means of a fixed tab and at least one biasing tab which may be manipulated to thereby release the mirror from the mirror assembly.

Thus it is an object of the invention to provide a combination magnetic pick up tool and inspection mirror which utilizes the magnetic pick up element to hold a mirror assembly in position on the end of a telescopic handle.

Another object of the invention is to provide a combination magnetic pick up tool and inspection mirror wherein the inspection mirror may be easily removed and replaced on the magnetic pick up tool in any one of a desired number of orientations.

A further object of the invention is to provide a combination magnetic pick up tool and inspection mirror wherein the inspection mirror is incorporated in a mirror assembly which may be attached to the magnetic pick up element of the tool and maintained attached thereto in a desired and fixed orientation which may be adjusted.

Another object of the invention is to provide an inexpensive, rugged, and easily used magnetic pick up tool and inspection mirror in combination.

A further object of the invention is to provide a magnetic pick up tool and mirror assembly wherein the mirror assembly may be easily and quickly magnetically attached or detached from the magnetic pick up tool portion of the tool.

Another object of the invention is to provide a telescopic handle which is used in combination with a magnet to provide a magnetic pick up tool and which may be utilized in further combination with a mirror assembly that is engaged by and held by the magnetic element of the magnetic pick up tool.

These and other objects, advantages and features of the invention will be set forth in a detailed description which follows.

BRIEF DESCRIPTION OF THE DRAWING

In the detailed description which follows reference will be made to the drawing comprised of the following figures:

FIG. 6 is a plan view of the connection fixture attached to the free end of the top section of the telescoping tubular members or section forming the handle of the magnetic pick up tool;

FIG. 7 is a side elevation of the connection fixture of FIG. 6;

FIG. 8 is a cross sectional view of the connection fixture of FIG. 7 taken along the line 8—8;

FIG. 9 is an end view of the connection fixture of FIG. 7; and

FIG. 10 is an isometric view of the mirror assembly and pick up handle of the invention as assembled and as illustrating the use thereof

DESCRIPTION OF THE PREFERRED EMBODIMENT

Figure 1:
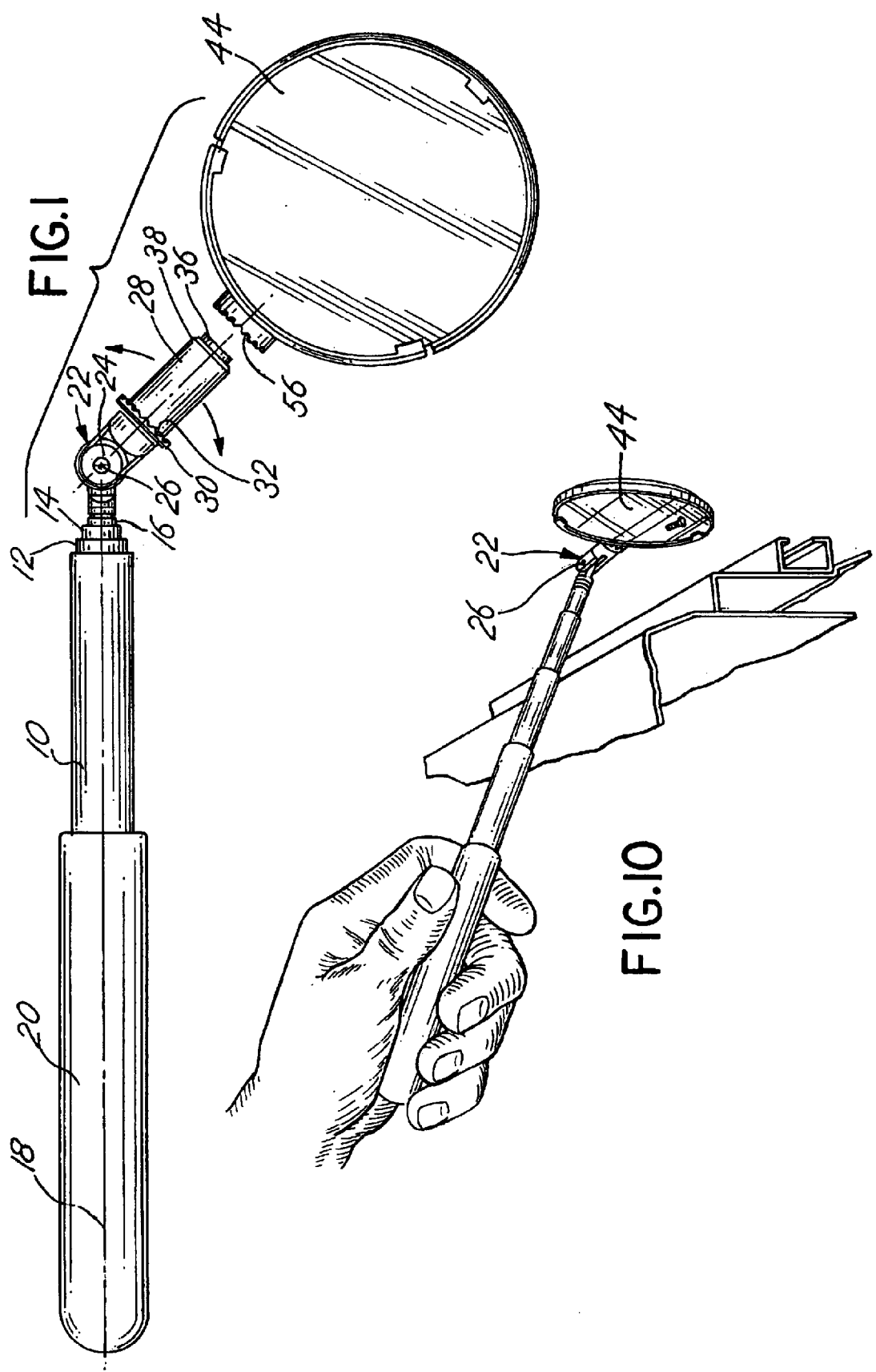
FIG. 1 is a side elevation of a combination magnetic pick up section or element of the tool and the mirror assembly of the tool.

Referring to the Figures, the tool of the invention is a combination magnetic pick up tool and inspection mirror. As depicted in FIG. 1 and FIG. 10, the magnetic pick up portion of the tool comprises a series of telescopic sections 10, 12, 14, 16 which are nested one within the other and which may be extended along a longitudinal axis 18. A hand grip 20 is affixed to the large diameter section 10. The sections 10, 12, 14 and 16 may be telescopically extended in the direction of the longitudinal axis 18 from the section 10 having grip 20 . A top or outermost extending section 16 constitutes the outer end or extension of the magnetic pick up portion of the tool and has a free end with a connection fixture 22 attached thereto. The connection fixture 22 includes a pivot connection 24 which permits pivoting about an axis 26. The connection fixture 22 further includes a cylindrical housing 28. The housing 28 may thus be pivoted about the axis 26 in the direction indicated by the arrows in FIG. 1. The housing 28 further includes a circumferential, annular outer ring 30 having a series of detents 32 uniformly spaced about the circumference thereof. The housing 28 has a generally uniform cylindrical configuration and retains or contains a cylindrical magnet 36 projecting from the outer end 38 of the housing 28.

As noted in FIGS. 6–9, the top section 16 of the tool handle includes a flange or element 17 which fits intermediate the yoke 29 of the housing 28. A pin or rivet 19 connects the top section 16 to the yoke 29 for pivoting about the axis 26. The connection is frictional so that the angle of pitch or inclination of the housing 28 relative to the top section 16 may be adjusted manually, and will remain in a fixed position once adjusted.

The embodiment so far described comprises a magnetic pick up tool which is highly adjustable. That is, the sections 10, 12, 14 and 16 may be extended to a desired length. The housing 28 and thus the magnet 36 may be adjusted to a desired angle so as to fit into a small opening or some difficult to reach place to magnetically attract a fastener or some other element which is to be retrieved magnetically.

Figure 2:
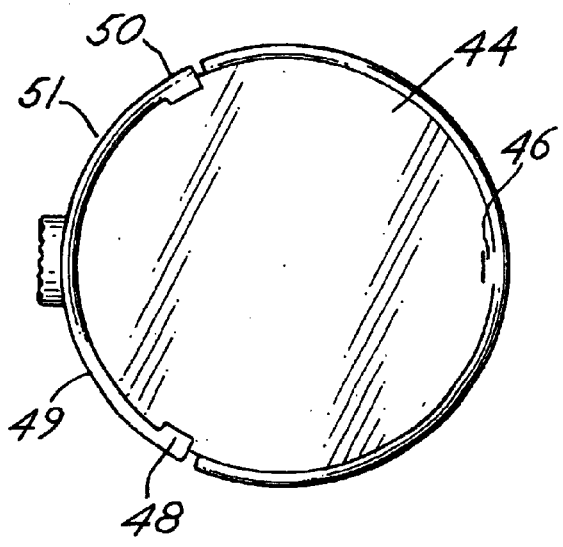
FIG. 2 is a plan view of the mirror assembly of the tool of FIG. 1.
Figure 2A:
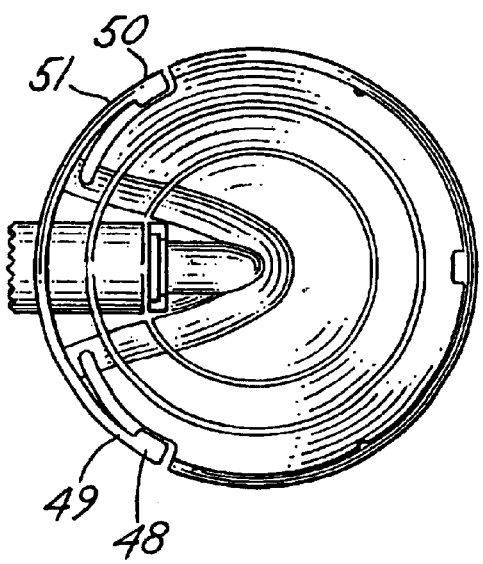
Figure 3:
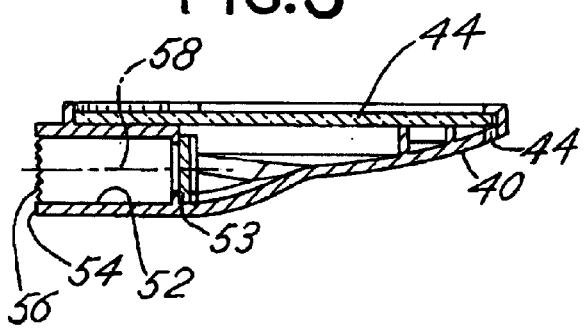
FIG. 3 is a cross sectional view of the mirror assembly of FIG. 2 taken along the line 3—3 in FIG. 2.
Figure 4:
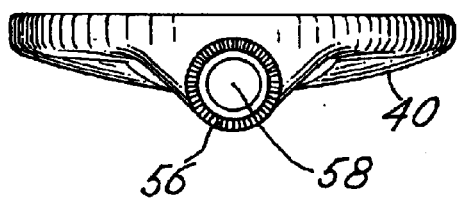
FIG. 4 is an end view of the mirror assembly of FIG. 2.
Figure 5:
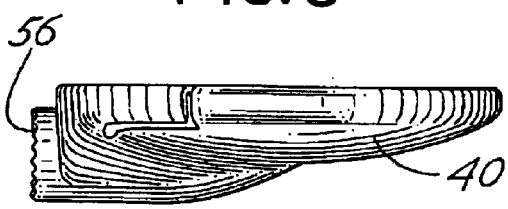
FIG. 5 is a side elevation of the mirror assembly of FIG. 2.

FIG. 1 and FIGS. 2–5 illustrate in greater detail the construction of the mirror assembly used in combination with the tool so far described and, in particular, with the combination thereof with the connection fixture 22. Referring to FIGS. 2–5, the mirror assembly includes a mirror housing 40. The mirror housing 40 includes a peripheral edge or a land or flange 42 adapted to permit receipt and seating of a planar, flat mirror 44, for example, a circular mirror made from stainless steel metal, glass or plastic. The mirror housing 40 thus provides a generally circular flange or land support 42 on which the mirror 44 may be rested. A fixed tab 46 is provided spaced from the land support 42 to project over the mirror 44 to facilitate the retention thereof in the housing 40. Biasing tabs 48, 50 mounted on flexible arms 49, 51, respectively, such as depicted in FIG. 2A are provided and snap over mirror 44 to retain the mirror 44 in position. The biasing tabs 48, 50 thus are mounted on cantilever elastic or spring arms 49 and 51, respectively, attached to the housing 40 and may be manually manipulated to disengage tabs 48, 50 from the mirror 44 to permit replacement thereof due to movement manually of tabs 48, 50 from engagement with mirror 44.

The mirror housing 40 further includes a cylindrical receptacle opening 52 designed to receive the housing 28 of the connection fixture 22. Thus the housing 28 may slide axially into the cylindrical opening 52. The magnet 36 will magnetically couple with a steel or other magnetic material or keeper plate 53 at the end of the cylindrical opening 52. In this manner the mirror housing 40 is retained on the connection fixture 22 and more particularly, on the cylindrical housing 28. The outer surface or edge 54 of the cylindrical chamber 52 includes a series of detent members 56 around the periphery thereof which are adapted to engage with the detent openings 32 of the ring 30. Thus when the mirror assembly and, more particularly, the mirror housing 40 is placed on the magnetic housing 28, the mirror housing 40 will be retained in a desired orientation due to the engagement of the detents 56 with the detents 32. Manual manipulation of the mirror housing 40 can then adjust the angle and orientation of the mirror housing. As can be appreciated, the mirror housing 40 can be adjusted about the centerline axis 58 in FIGS. 3 and 6 which coincides with center line axis of housing 28. The mirror housing 40 may also be adjusted by pivoting about the axis 26. Consequently, a full range of adjustment of the mirror assembly is permitted and, upon appropriate adjustment, the mirror assembly will be held in a fixed position.

In the preferred embodiment, the telescoping sections 10, 12, 14, 16 are designed so that they will be non-rotatable about the longitudinal axis 18. For example, the telescoping sections may include a key construction to preclude rotation or may have a polygonal cross section or other means may be utilized to preclude rotation thereof. Preclusion of rotation is a desirable feature in the combination in order to ensure the proper orientation, not only of the magnet 36, but of the mirror assembly including the mirror housing 40.

There are other aspects or features of the invention which may be varied. For example, the connection fixture may incorporate a two axis adjustment mechanism. The size and shape of the mirror assembly may be varied. The mechanism providing for a detent engagement of the mirror assembly with the magnetic housing 28 may be varied. Thus the invention is to be limited only by the following claims and equivalents thereof.

What is claimed is:

1. A combination magnetic pick up tool and inspection mirror comprising, in combination:

a handle, said handle including a plurality of telescoping sections extendable between an extended position and a retracted position, including a top section having a free end;

a connection fixture pivotally attached to the free end of the top section, said connection fixture including a magnet, said fixture including a registration element; and a mirror assembly having a mirror mounted thereon, said mirror assembly including a magnet receptacle for removable receipt of the magnet, and magnetic attachment of the mirror assembly to the connection fixture.

2. The tool and inspection mirror combination of claim 1 wherein the mirror housing includes a cooperative element for engagement and retention of the registration element at one of a multiple number of orientations.

3. The tool and inspection mirror combination of claim 1 wherein the mirror housing includes a magnet keeper member.

4. The tool and inspection mirror combination of claim 1 wherein the registration element comprises a detent member on the fixture and the mirror housing includes a detent engaging member.

5. The tool and inspection mirror combination of claim 1 wherein the mirror assembly comprises a mirror housing for removably mounting a mirror.

6. The combination of claim 5 wherein the mirror housing comprises a removable mirror, a mirror support land for mounting the mirror, a fixed mirror retention tab for retaining the mirror on the land, and a biased retention tab for engaging and retaining the mirror on the land and for releasing the mirror from mounting on the land.

* * * * *